US006963749B2

(12) United States Patent
Hayashida

(10) Patent No.: US 6,963,749 B2
(45) Date of Patent: Nov. 8, 2005

(54) RADIO COMMUNICATION TERMINAL UNIT AND METHOD OF TRANSMITTING LOCATION INFORMATION

(75) Inventor: Atsushi Hayashida, Kariya (JP)

(73) Assignee: Denso Corporation, Kariya (JP)

( * ) Notice: Subject to any disclaimer, the term of this patent is extended or adjusted under 35 U.S.C. 154(b) by 412 days.

(21) Appl. No.: 10/186,713

(22) Filed: Jul. 2, 2002

(65) Prior Publication Data

US 2003/0027582 A1    Feb. 6, 2003

(30) Foreign Application Priority Data

Aug. 6, 2001    (JP)    ............................. 2001-237839

(51) Int. Cl.$^7$ .............................................. H04Q 7/20
(52) U.S. Cl. .............................. 455/456.6; 455/456.6; 455/457; 342/357.01; 342/357.15
(58) Field of Search .................... 455/456.6, 456.1, 455/457; 342/357.1, 357.15

(56) References Cited

U.S. PATENT DOCUMENTS

| 5,225,843 | A | * | 7/1993 | Thompson ................... 342/367 |
| 5,581,804 | A | * | 12/1996 | Cameron et al. ......... 455/456.1 |
| 5,857,155 | A | * | 1/1999 | Hill et al. ................ 455/456.6 |
| 6,175,725 | B1 | * | 1/2001 | Auber ........................ 455/130 |
| 6,289,279 | B1 | * | 9/2001 | Ito et al. ..................... 701/213 |
| 6,313,787 | B1 | | 11/2001 | King et al. |
| 6,400,943 | B1 | * | 6/2002 | Montoya ................. 455/456.5 |
| 6,429,808 | B1 | | 8/2002 | King et al. |
| 6,433,735 | B1 | * | 8/2002 | Bloebaum et al. ........ 342/357.1 |
| 6,640,107 | B1 | * | 10/2003 | Kuwahara et al. ........ 455/456.6 |
| 6,675,011 | B1 | * | 1/2004 | Kita ........................ 455/422.1 |
| 6,707,422 | B2 | * | 3/2004 | Sheynblat et al. ..... 342/357.12 |
| 6,750,813 | B2 | * | 6/2004 | Vargas-Hurlston et al. ...... 342/357.09 |
| 2003/0011511 | A1 | * | 1/2003 | King et al. ............ 342/357.02 |

FOREIGN PATENT DOCUMENTS

| JP | A 2000-55686 | 2/2000 |
| WO | WO 99/61934 | 12/1999 |

OTHER PUBLICATIONS

Nikkei Communications, Jul. 17, 2000 pp. 115-121.

* cited by examiner

Primary Examiner—William Trost
Assistant Examiner—Sharad Rampuria
(74) Attorney, Agent, or Firm—Oliff & Berridge, PLC

(57) ABSTRACT

A cellular phone unit receives GPS satellite information of GPS satellites and base station information of base stations. It extracts the GPS satellite information and the base station information that meet transmission conditions, which are provided by a location information server, out of the obtained GPS satellite information and base station information. Those extracted information are sent to the location information server. Based on the receiving from the location information server a transmission condition in terms of the condition of accurate specifying of the location of cellular phone unit by the location information server, the cellular phone unit can extract proper GPS satellite information and base station information and send the extracted information to the location information server.

8 Claims, 6 Drawing Sheets

FIG. 3A

| GPS NO. | ELEVATION (°) | AZIMUTH | OK/NG |
|---|---|---|---|
| 1 | 80 | EAST | OK |
| 4 | 30 | SE | NG |
| 7 | 70 | WEST | OK |
| 9 | 45 | SSW | NG |
| 10 | 30 | NNE | NG |
| 12 | 15 | SE | NG |
| 15 | 80 | SOUTH | OK |
| 19 | 70 | NORTH | OK |
| 20 | 50 | WSW | NG |
| 21 | 60 | NW | OK |
| 23 | 20 | ENE | NG |

FIG. 3B

| BASE NO. | AZIMUTH | OK/NG |
|---|---|---|
| 262 | NORTH | OK |
| 72 | SOUTH | NG |
| 92 | SOUTH | OK |
| 188 | EAST | OK |
| 184 | NW | NG |
| 266 | SW | OK |
| 80 | NE | NG |

FIG. 4A

| ITEM | CONDITION |
|---|---|
| POWER | MORE THAN 35dB |
| PHASE DIFFERENCE VARIATION | LESS THAN 50m |

FIG. 4B

| ITEM | CONDITION |
|---|---|
| SIGNAL-TO-NOISE | MORE THAN −15dB |
| PHASE DIFFERENCE VARIATION | LESS THAN 150m |

FIG. 6

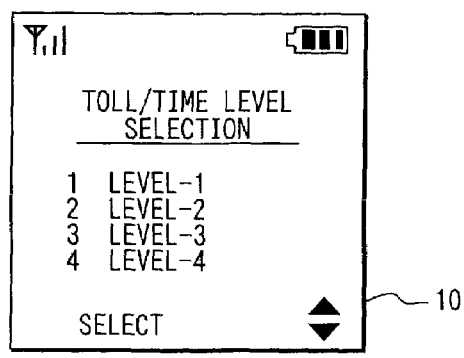

FIG. 7

| LEVEL | TRANSMISSION CONDITION (GPS) | TRANSMISSION CONDITION (BASE STATION) |
|---|---|---|
| LEVEL-1 | ——— | UPPER THREE LARGEST S/N |
| LEVEL-2 | UPPER THREE LARGEST POWER | UPPER TWO LARGEST S/N |
| LEVEL-3 | POWER ····MORE THAN 30dB<br>VARIATION····LESS THAN 70m<br>NUMBER ····ALL | POWER ····MORE THAN −20dB<br>VARIATION····LESS THAN 150m<br>NUMBER ····ALL |
| LEVEL-4 | POWER ····UNLIMITED<br>VARIATION····UNLIMITED<br>NUMBER ····UNLIMITED | POWER ····UNLIMITED<br>VARIATION····UNLIMITED<br>NUMBER ····UNLIMITED |

RADIO COMMUNICATION TERMINAL UNIT AND METHOD OF TRANSMITTING LOCATION INFORMATION

CROSS REFERENCE TO RELATED APPLICATION

This application is based on and incorporates herein by reference Japanese Patent Application No. 2001-237839 filed on Aug. 6, 2001.

FIELD OF THE INVENTION

The present invention relates to a radio communication terminal unit, which receives location information and sends it to a location information server, a computer program which is run by a radio communication terminal unit, and a method of transmitting location information.

BACKGROUND OF THE INVENTION

A specifying location system which detects the locations of radio communication terminal units, e.g., cellular phone units, performs based on the IS (Interim Standard) 801 protocol. The sequential operations implemented under IS 801 protocol is shown in FIG. 8.

As shown in FIG. 8, a cellular phone unit 1 is instructed by the user to find its location. It makes access to nearby base stations thereby to get base station information of these base stations (step 101), transmits the base station information to a location information server 15, and requests the server to release assistant information useful for the access to GPS (Global Positioning System) satellites.

The location information server 15, upon receiving the base station information from the cellular phone unit 1, specifies or determines the approximate location of the phone unit based on the received base station information, and it responds to the request of assistant information to compute assistant information useful for the cellular phone unit to make access to GPS satellites and send the computed assistant information to the phone unit 1 (step 151).

The cellular phone unit 1, upon receiving the assistant information from the location information server (15), makes access to GPS satellites based on the assistant information thereby to get GPS satellite information of the GPS satellites, makes access to the base stations again to get their base station information again, sends the obtained GPS satellite information and base station information to the location information server, and requests the server to release the specified location.

The location information server 15 receives the GPS satellite information, base station information and request of specifying location from the cellular phone unit 1, detects the location of phone unit based on the received information, and sends the specified location to the phone unit 1 (step 152).

This system enables the cellular phone unit 1 to make access to GPS satellites based on the assistant information provided by the location information server 15, instead of having to keep almanac information by itself. It is advantageous for the whole system to minimize the time before the start of location specifying operation and also advantageous for each cellular phone unit to reduce its overhead operation based on the reliance of location specifying operation on the location information server.

In regard to the above sequential operations, the cellular phone unit 1 sends to the location information server 15 all of GPS satellite information resulting from the access to GPS satellites and base station information resulting from the access to base stations. Therefore, it is likely that information which is unnecessary or even detrimental for the location specifying operation to the location information server 15 is sent. In this case, the location information server 15 might not be able to detect the location of phone unit accurately. Another drawback is a considerable communication toll and time imposed on the transmission of GPS satellite information and base station information.

SUMMARY OF THE INVENTION

In view of the foregoing situation, it is an object of the present invention to provide a radio communication terminal unit, a computer program, and a method of transmitting location information which all enable the transmission of proper location information to the location information server, the reduction of communication toll and time for sending location information, and the enhancement of accuracy and reliability of specifying location for the radio communication terminal unit.

According to the present invention, in a radio communication system, a radio communication terminal unit receives a transmission condition from an outside such as a location information server and acquires location information. The radio communication terminal unit extracts a part of the location information that meets the transmission condition out of the obtained location information. Only the extracted location information is sent to the location information server.

BRIEF DESCRIPTION OF THE DRAWINGS

The above and other objects, features and advantages of the present invention will become more apparent from the following detailed description made with reference to the accompanying drawings.

FIGS. 3A and 3B are tables showing examples of transmission conditions in the first embodiment;

FIGS. 4A and 4B are tables showing examples of transmission conditions in the first embodiment;

FIG. 6 is a diagram showing an example of display on the cellular phone unit in the second embodiment;

FIG. 7 is a table showing an example of the correspondence between the toll/time levels and the transmission conditions in the second embodiment.

DETAILED DESCRIPTION OF THE PREFERRED EMBODIMENTS (First Embodiment)

The first embodiment of this invention which is applied to a cellular phone unit will be explained with reference to FIG. 1 through FIG. 4.

Figure 1:
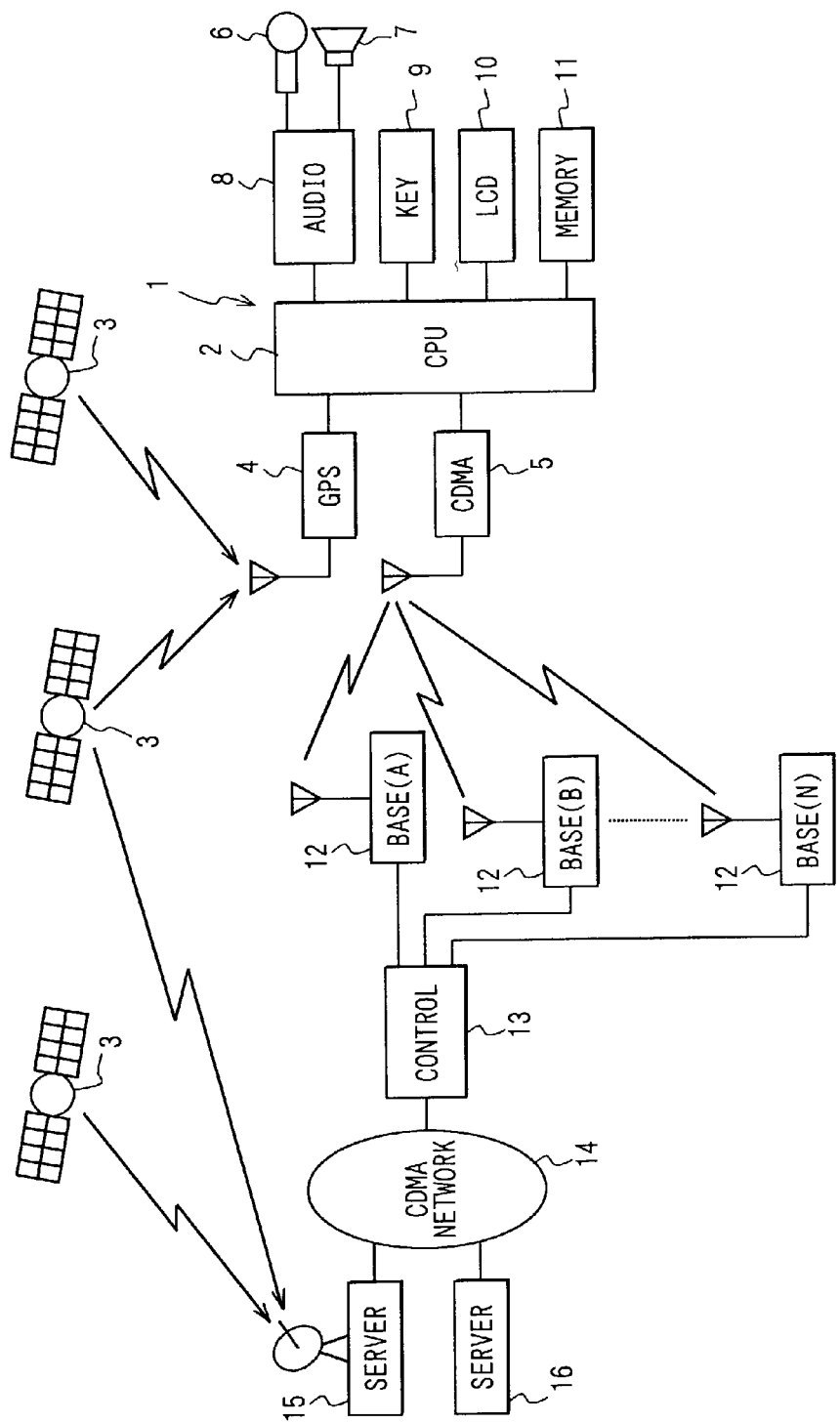
FIG. 1 is a block diagram showing a radio communication system and a cellular phone unit according to first embodiment of this invention.

In FIG. 1, a cellular phone unit 1 includes a CPU (central processing unit) 2, a GPS (global positioning system) communication device 4 which transacts the GPS radio wave signals with GPS satellites 3, a CDMA (code division multiple access) communication device 5 for implementing the telephone operation based on the CDMA scheme, an audio processor 8 which deals with a voice signal entered by a microphone 6 and a voice signal to be released by a speaker 7, a key set 9 with its set of communication start key, communication end key and numeric keys, a liquid crystal display panel 10 which displays the date and time and telephone number, and a memory 11 which includes RAM (random access memory) and ROM (read only memory).

The cellular phone unit 1 gets GPS satellite information from GPS satellites 3 and base station information from base stations 12, and sends the obtained information to the base stations 12 and to the location information server 15 via the base station control facility 13 and CDMA telephone network 14. The location information server 15 receives GPS satellite information and base station information from the cellular phone unit 1, and operates to detect the location of the phone unit 1 based on the received information.

A contents server 16 sends contents data of application programs, e.g., games and map display, to the cellular phone unit 1 via the CDMA telephone network 14, base station control facility 13 and base stations 12. By receiving contents data from the contents server 16, the phone unit 1 runs the application program by using the received contents data so that a game picture or map is displayed on the display panel 10.

Figure 2:
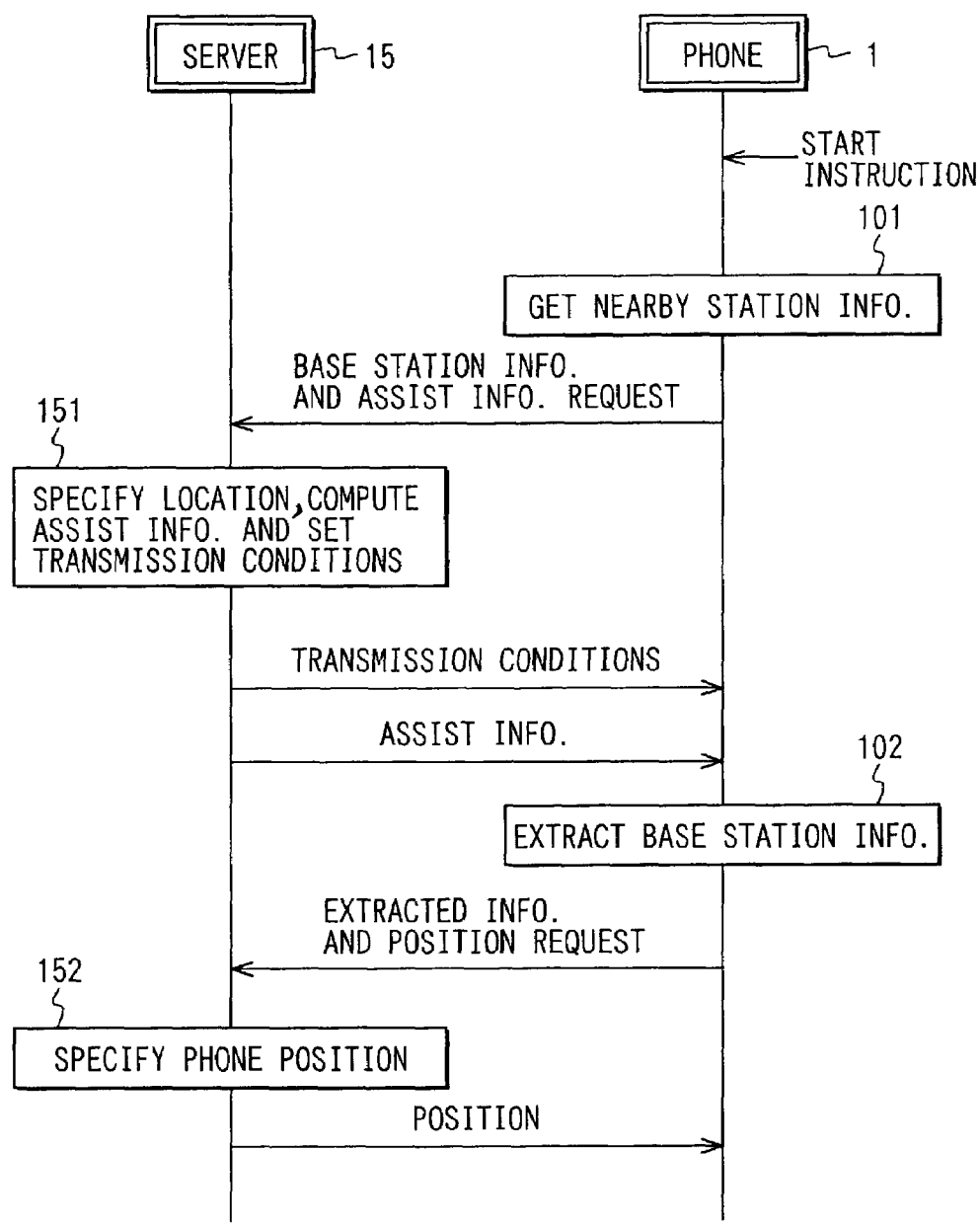
FIG. 2 is a flow diagram showing the sequential operations for specifying location according to the first embodiment.

The sequential operations of the system will be explained with reference to FIG. 2, FIG. 3 and FIG. 4.

A user operates the key set 9 of cellular phone unit 1 to instruct the start of specifying location. The CPU 2 responds to the user's instruction and operates on the CDMA communication device 5 to make access to base stations 12 thereby to get their base station information (step 101), and further operates on the CDMA communication device 5 to send the obtained base station information to the location information server 15 and request the server to release assistant information useful for the access to GPS satellites 3.

The location information server 15 receives the base station information from the cellular phone unit 1, and determines the approximate location of the phone unit 1 based on the base station information. It also receives the request of assistant information and computes assistant information useful for the phone unit 1 to make access to GPS satellites 3.

The location information server 15 further sets a transmission condition for GPS satellites 3 and a transmission condition for base stations 12 (step 151). Specifically, the location information server 15 determines the approximate location of the cellular phone unit 1 based on the base station information provided by the phone unit 1, and selects GPS satellites as subjects of access by the phone unit 1, e.g., eleven GPS satellites #1, #4, #7, #9, #10, #12, #15, #19, #20, #21 and #23 as shown in the table of FIG. 3A. The location information server 15 compares the elevation angles and azimuths of the selected GPS satellites to designate proper GPS satellites, e.g., five proper GPS satellites #1, #7, #15, #19 and #21, and sets a transmission condition so that the cellular phone unit 1 sends GPS satellite information of the five proper GPS satellites. The transmission condition may include the GPS satellite numbers.

The location information server 15 selects base stations as subjects of access by the phone unit 1 based on the approximate location of the phone unit 1, e.g., seven base stations #262, #72, #92, #188, #184, #266 and #80 as shown in the table of FIG. 3B. The location information server 15 compares the azimuths (positional relation with the phone unit 1) of the seven base stations to designate proper base stations e.g., four proper base stations #262, #92, #188 and #266, and sets a transmission condition so that the cellular phone unit 1 sends base station information of the four proper base stations. The transmission condition may include the base station numbers.

The location information server 15 sends the established transmission condition for the GPS satellites 3 and transmission condition for the base stations 12 to the cellular phone unit 1, and also sends the computed assistant information to the phone unit 1.

On the part of the cellular phone unit 1, the CPU 2 detects the receiving by the CDMA communication device 5 of the transmission condition for GPS satellites 3 and transmission condition for base stations 12 from the location information server 15 and also detects the receiving by the CDMA communication device 5 of the assistant information from the location information server 15, operates on the GPS communication device 4 to make access to GPS satellites based on the received assistant information thereby to get GPS satellite information, and operates on the CDMA communication device 5 to make access to base stations 12 again thereby to get base station information of the base stations again.

The CPU 2 extracts GPS satellite information that meets the transmission condition provided by the location information server 15 out of the obtained GPS satellite information, and also extracts base station information that meets the transmission condition provided by the location information server 15 out of the obtained base station information (step 102).

Specifically, for example, the CPU 2 gets GPS satellite information of the 11 GPS satellites #1, #4, #7, #9, #10, #12, #15, #19, #20, #21 and #23 based on the assistant information provided by the location information server 15, and extracts GPS satellite information of the five GPS satellites #1, #7, #15, #19 and #21 out of the obtained GPS satellite information based on the transmission condition provided by the location information server 15. The CPU 2 operates on the CDMA communication device 5 to make access to base stations 12 thereby to get base station information of the seven base stations #262, #72, #92, #188, #184, #266 and #80, and extracts base station information of the four base stations #262, #92, #188 and #266 out of the obtained base station information based on the transmission condition provided by the location information server 15.

The CPU 2 operates on the CDMA communication device 5 to send to the location information server 15 the GPS satellite information and base station information extracted based on the transmission conditions, and request the server to release the specified location. Namely, the cellular phone unit 1 extracts GPS satellite information and base station information that meet the transmission conditions provided by the location information server 15 out of the obtained GPS satellite information and base station information and sends the extracted information to the location information server 15, instead of sending all of the obtained GPS satellite information and base station information to the location information server 15.

The location information server 15 receives the GPS satellite information and base station information from the cellular phone unit 1 and also receives the request of the release of the specified location from the phone unit 1, specifies the location of the phone unit 1 based on the received GPS satellite information and base station information, and sends the specified location to the phone unit 1 (step 152).

The foregoing system is designed such that the location information server 15 selects GPS satellite information to be sent from the cellular phone unit 1 based on the comparison of elevation angles and azimuths among the 11 GPS satellites which are accessible by the phone unit 1 and selects base station information to be sent from the phone unit 1 based on the comparison of azimuths among the seven base stations which are accessible by the phone unit 1.

Alternatively, it is possible to set a transmission condition in terms of the threshold values of receiving power level and phase difference variation of GPS satellite signals and set a transmission condition in terms of the threshold values of signal-to-noise ratio and phase difference variation of base station signals as shown in FIGS. 4A and 4B. These threshold values are determined based on the installation and environmental states of the base stations 12 for example.

Specifically, for example, the location information server 15 sets the threshold value of receiving power level to be 35 dB and the threshold value of phase difference variation to be 50 m for GPS satellite signals, and then the cellular phone unit 1 extracts GPS satellite information that meets the signal receiving power level of 35 dB or more and the signal phase difference variation of 50 m or less out of the obtained GPS satellite information, and sends the extracted information to the location information server 15. The location information server 15 sets the threshold value of signal-to-noise ratio to be −15 dB and the threshold value of phase difference variation to be 150 m for base station signals. Then the cellular phone unit 1 extracts base station information that meets the signal-to-noise ratio of −15 dB or more and the signal phase difference variation of 150 m or less out of the obtained base station information, and sends the extracted information to the location information server 15.

Alternatively, the transmission condition for GPS satellites may be either a signal receiving power level of 35 dB or more or signal phase difference variation of 50 m or less. The transmission condition for base stations may be either a signal-to-noise ratio of −15 dB or more or a signal phase difference variation of 150 m or less.

Still alternatively, the system may be designed such that the location information server 15 has a learning function so that it processes statistically transmission conditions which have been sent to the cellular phone unit 1 in the past and GPS satellite information and base station information which have been received from the phone unit 1 in the past and sends transmission conditions which are derived from the statistical process result to the phone unit 1.

According to the foregoing first embodiment, the cellular phone unit 1 gets GPS satellite information and base station information, extracts GPS satellite information and base station information that meet the transmission conditions provided by the location information server 15, and sends the extracted GPS satellite information and base station information to the location information server 15. The cellular phone unit 1 receives the condition for the accurate determination of phone unit location by the location information server 15 in the form of transmission conditions, and extracts proper GPS satellite information and base station information to be sent to the location information server 15, instead of sending all of the obtained GPS satellite information and base station information. In consequence, the communication toll and time expended for the transmission of GPS satellite information and base station information can be reduced.

After that, the location information server 15 receives only proper GPS satellite information and proper base station information from the phone unit 1, and determines the location of phone unit 1 based solely on the received proper GPS satellite information and base station information. In consequence, the location of phone unit 1 can be specified accurately, and the system is enhanced in reliability.

In case the location information server 15 sends the transmission conditions as shown in the tables of FIGS. 3A and 3B to the cellular phone unit 1, it is not necessary for the phone unit 1 to make determination by itself on the extraction of GPS satellite information for each GPS satellite 3 and on the extraction of base station information for each base station 12, but the determination is done by the location information server 15, and the cellular phone unit 1 can lighten the overhead operation accordingly.

In case the location information server 15 sends the transmission conditions as shown in the tables of FIGS. 4A and 4B to the phone unit 1, the phone unit 1 makes determination on the extraction of GPS satellite information for each GPS satellite 3 based on the comparison of receiving power level and phase difference variation of GPS satellite signal with their threshold values and on the extraction of base station information for each base station 12 based on the comparison of signal-to-noise ratio and phase difference variation of base station signal with their threshold values thereby to select by itself proper GPS satellites and base stations. The location information server 15 can lighten the operation accordingly.

(Second Embodiment)

Figure 5:
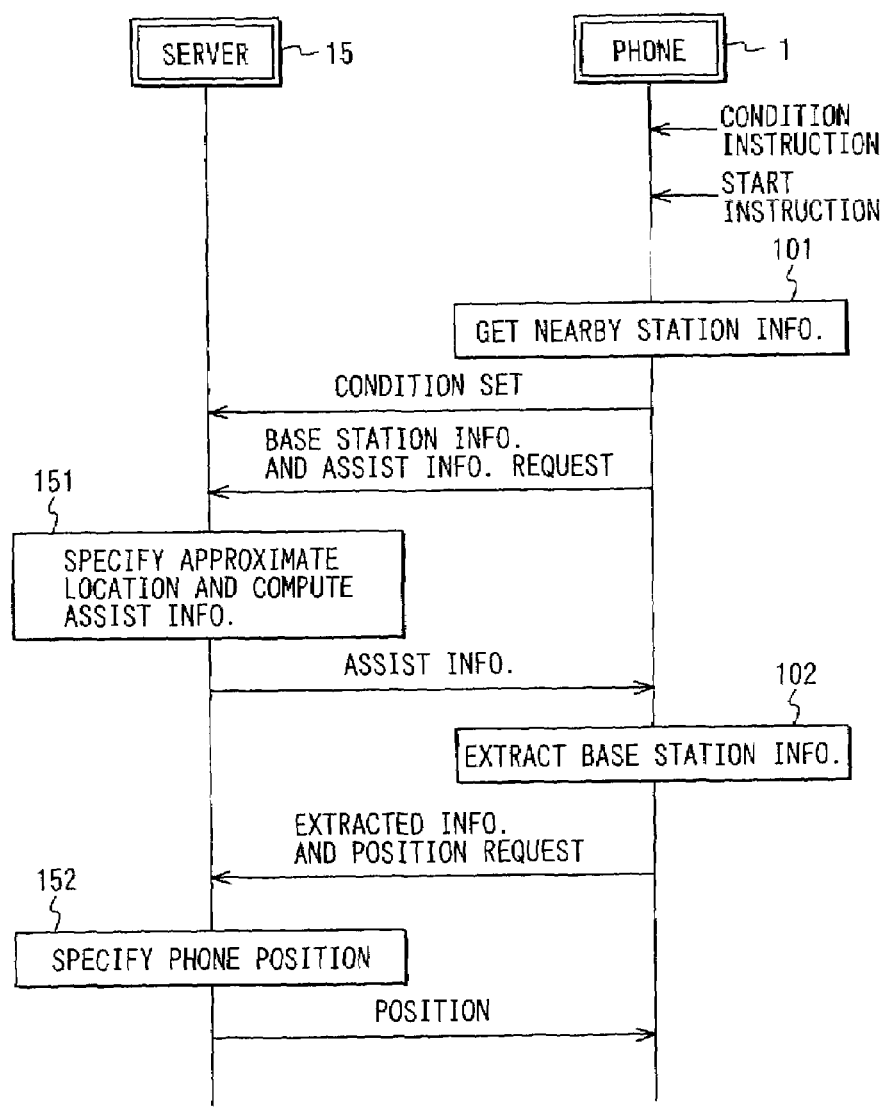
FIG. 5 is a flow diagram showing the sequential operations for specifying location according to a second embodiment of this invention.
Figure 8:
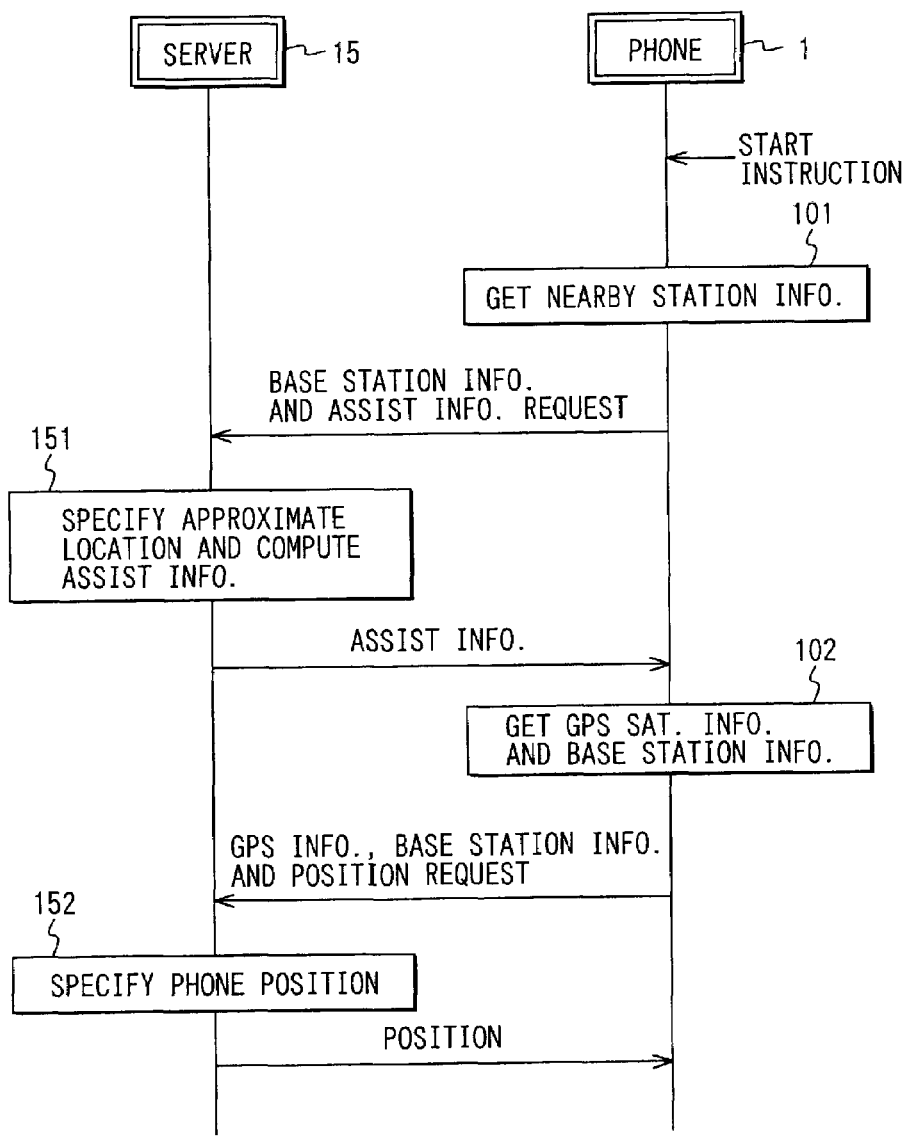
FIG. 8 is a flow diagram showing the sequential operations for specifying location according to a related art.

The second embodiment of this invention will be explained with reference to FIG. 5 through FIG. 7. The following explains only portions different from the first embodiment. In contrast to the first embodiment in which the location information server 15 sends transmission conditions to the cellular phone unit 1, this embodiment is designed such that a user of cellular phone unit 1 sets a transmission condition and the phone unit 1 sends GPS satellite information and base station information that meet the transmission condition to the location information server 15.

Prior to the instruction of start of specifying location to the cellular phone unit 1, the user instructs a transmission condition. Specifically, the user opens the toll & time selection screen shown in FIG. 6 on the display panel 10 of phone unit 1 and specifies a transmission condition from among level-1, level-2, level-3 and level-4. These levels represent transmission conditions of GPS satellite information and base station information as shown in the table of FIG. 7 for example.

Following the setting of the transmission condition on the cellular phone unit 1, the CPU 2 detects the instruction of start of specifying location by the user on the keyboard 9 and operates on the CDMA communication device 5 to make access to base stations 12 thereby to get base station information of base stations 12 which are accessible by the phone unit 1. The CPU 2 operates on the CDMA communication device 5 to send transmission condition setup signal indicative of the setting of transmission condition to the location information server 15. The CPU 2 operates on the CDMA communication device 5 to send the obtained base station information to the location information server 15 and request the server 15 to release assistant information useful for the phone unit 1 to make access to GPS satellites 3.

The location information server 15, upon receiving the transmission condition setup signal and base station information from the cellular phone unit 1, determines the approximate location of the phone unit 1 based on the received base station information. It responds to the request of assistant information to compute assistant information useful for the phone unit 1 to make access to GPS satellites and send the computed assistant information to the phone unit 1.

On the part of the cellular phone unit 1, the CPU 2, upon detecting the receiving of assistant information from the location information server 15, operates on the GPS communication device 4 to make access to GPS satellites 3 based on the received assistant information thereby to get GPS satellite information of the GPS satellites 3 and operates on the CDMA communication device 5 to make access to base stations 12 again thereby get base station information of the base stations 12.

The CPU 2 extracts GPS satellite information that meets the setup transmission condition out of the obtained GPS satellite information, and also extracts base station information that meets the setup transmission condition out of the obtained base station information.

Specifically, for the transmission condition of level-1, the CPU 2 does not extract GPS satellite information, but extracts base station information of the base stations 12 with the upper three largest signal-to-noise ratios (S/N). For the transmission condition of level-2, the CPU 2 extracts GPS satellite information of the GPS satellites 3 with the upper three largest receiving power levels and extracts base station information of the base stations 12 with the upper two largest signal-to-noise ratios.

For the transmission condition of level-3, the CPU 2 extracts GPS satellite information of the GPS satellites 3 with receiving signal power levels of 30 dB or more and with phase difference variations of 70 m or less, and extracts base station information with signal-to-noise ratios of −20 dB or more and with phase difference variations of 150 m or less. For the transmission condition of level-4, the CPU 2 takes all GPS satellite information and takes all base station information.

The CPU 2 operates on the CDMA communication device 5 to send the GPS satellite information and base station information, which have been extracted based on the transmission condition, to the location information server 15 and request the release of the specified location. Namely, the cellular phone unit 1 extracts GPS satellite information and base station information that meet the transmission condition set by the user out of the obtained GPS satellite information and base station information and sends the extracted information to the location information server 15, instead of sending all of the obtained GPS satellite information and base station information to the location information server 15.

In one case of the setting of transmission condition at level-1, the cellular phone unit 1 sends a minimal amount of information, which is solely base station information without GPS satellite information, to the location information server 15. In another case of the setting of transmission condition at level-4, the cellular phone unit 1 sends a maximal amount of information, which is all of the obtained GPS satellite information and base station information, to the location information server 15.

The location information server 15, upon receiving the GPS satellite information and base station information and receiving the request of specifying location from the cellular phone unit 1, determines the location of phone unit 1 based on the received GPS satellite information and base station information and sends the specified location to the phone unit 1.

According to the foregoing second embodiment, the cellular phone unit 1 gets the GPS satellite information and base station information, extracts GPS satellite information and base station information that meet the transmission condition set by the user, and sends the extracted GPS satellite information and base station information to the location information server 15. Based on the setting of a transmission condition, the cellular phone unit 1 can minimize the amount of information including GPS satellite information and base station information to be sent to the location information server 15 and thus can reduce the communication toll and time. By setting such a transmission condition as to reduce the communication time, the communication toll and time for sending GPS satellite information and base station information can be reduced. Based on the setting of a transmission condition which is presumed to be appropriate for the location information server 15 to point the location of cellular phone unit 1 accurately, it is also possible to send only proper GPS satellite information and base station information to the location information server 15.

(Other Embodiments)

The present invention is not confined to the foregoing embodiments, but the following variations or expansion are possible. The radio communication terminal can be a portable information terminal unit or other communication terminal unit, besides a cellular phone unit. The cellular phone unit may have a learning function so that an optimal threshold value of transmission condition is determined automatically. In regard to the second embodiment, the number of GPS satellites and the number of base stations in the transmission conditions of level-1 and level-2 are arbitrary.

The second embodiment may be applied to a system in which the cellular phone unit specifies the location by itself based on the GPS satellite information and base station information, besides the foregoing system design in which the location information server specifies the location of cellular phone unit based on the GPS satellite information and base station information sent from the phone unit. In this case, the user sets a location specifying condition, and the cellular phone unit extracts GPS satellite information and base station information that meet the condition out of the obtained GPS satellite information and base station information and specifies the location based solely on the extracted information.

The cellular phone unit which receives assistant information from the location information server may get only GPS satellite information based on the assistant information and sends to the location information server, besides the foregoing scheme of getting and sending both of GPS satellite information and base station information.

The computer program which is run by the CPU of cellular phone unit may be down-loaded from a certain server via the telephone network or may be transferred from a CD-ROM (compact disk read only memory) or magnetic card into the memory of phone unit, besides the provision in a ROM at the manufacturing of phone unit.

What is claimed is:

1. A radio communication terminal unit capable of communicating with a location information server and a base station, the unit comprising:

telephone radio communication means;

location information acquisition means for acquiring location-related information necessary for specifying a location of the unit, the location-related information includes GPS satellite information regarding the GPS satellites; and control means for transmitting, after transmitting base station information to the location information server to acquire an approximate location of the unit from the location information server when operated to start specifying a location, the location-related information to the location information server from the telephone radio communication means, wherein the control means extracts a part of the GPS satellite information transmitted from the location information server and received by the telephone radio communication means, and transmits the extracted part to the location information server from the telephone radio communication means, and wherein the part includes information that satisfies a transmission condition corresponding to a threshold value of power of a GPS satellite wave, the threshold value being set in accordance with an environment surrounding the approximate location of the unit.

2. A radio communication terminal unit capable of communicating with a location information server and a base station, the unit comprising:

telephone radio communication means;

location information acquisition means for acquiring location-related information necessary for specifying a location of the unit, the location-related information includes GPS satellite information regarding the GPS satellites; and control means for transmitting, after transmitting base station information to the location information server to acquire an approximate location of the unit from the location information server when operated to start specifying a location, the location-related information to the location information server from the telephone radio communication means, wherein the control means extracts a part of the GPS satellite information transmitted from the location information server and received by the telephone radio communication means, and transmits the extracted part to the location information server from the telephone radio communication means, and wherein the part includes information that satisfies a transmission condition corresponding to a threshold value of variation of phase difference in a GPS satellite wave, the threshold value being set in accordance with an environment surrounding the approximate location of the unit.

3. A radio communication terminal unit capable of communicating with a location information server and a base station, the unit comprising:

telephone radio communication means;

location information acquisition means for acquiring, when operated, location-related information necessary for specifying a location of the unit, the location-related information includes base station information regarding the base station; and control means for operating the location information acquisition means to acquire the location-related information after transmitting base station information to the location information server to acquire an approximate location of the unit from the location information server when operated to start specifying a location, and transmitting the location-related information to the location information server from the telephone radio communication means, wherein the control means extracts a part of the base station information acquired by the location information acquisition means, and transmits the extracted part to the location information server from the telephone radio communication means, and wherein the part includes information that satisfies a transmission condition corresponding to a threshold value of a signal-to-noise ratio of a GPS satellite wave, the threshold value being set in accordance with an arrangement of the base station near the approximate location of the unit.

4. A radio communication terminal unit capable of communicating with a location information server and a base station, the unit comprising:

telephone radio communication means;

location information acquisition means for acquiring, when operated, location-related information necessary for specifying a location of the unit, the location-related information includes base station information regarding the base station; and control means for operating the location information acquisition means to acquire the location-related information after transmitting base station information to the location information server to acquire an approximate location of the unit from the location information server when operated to start specifying a location, and transmitting the location-related information to the location information server from the telephone radio communication means, wherein the control means extracts a part of the base station information acquired by the location information acquisition means, and transmits the extracted part to the location information server from the telephone radio communication means, and wherein the part includes information that satisfies a transmission condition corresponding to a threshold value of variation of phase difference in a GPS satellite wave, the threshold value being set in accordance with an arrangement of the base station near the approximate location of the unit.

5. A method of transmitting location information for a radio communication terminal unit capable of communicating with a location information server and a base station, comprising:

transmitting base station information to the location information server from the radio communication terminal unit;

determining an approximate location of the radio communication terminal unit based on the base station information transmitted to the location information server from the radio communication terminal unit;

setting and transmitting a transmission condition to the radio communication terminal unit based on the approximate location;

receiving the transmission condition from the location information server in the radio communication terminal unit;

receiving GPS satellite information and base station information in the radio communication terminal unit;

extracting a portion of the GPS satellite information and the base station information according to the transmission condition;

transmitting the portion of the GPS satellite information and the base station information to the location information server from the radio communication terminal unit; and determining a location of the radio communication terminal unit based on the extracted portion of the GPS satellite information and the base station information, wherein the transmission condition corresponds to a threshold value of power of a GPS satellite wave, the threshold value being set in accordance with an environment surrounding the approximate location of the unit.

6. A method of transmitting location information for a radio communication terminal unit capable of communicating with a location information server and a base station, comprising:

transmitting base station information to the location information server from the radio communication terminal unit;

determining an approximate location of the radio communication terminal unit based on the base station information transmitted to the location information server from the radio communication terminal unit;

setting and transmitting a transmission condition to the radio communication terminal unit based on the approximate location;

receiving the transmission condition from the location information server in the radio communication terminal unit;

receiving GPS satellite information and base station information in the radio communication terminal unit;

extracting a portion of the GPS satellite information and the base station information according to the transmission condition;

transmitting the portion of the GPS satellite information and the base station information to the location information server from the radio communication terminal unit; and determining a location of the radio communication terminal unit based on the extracted portion of the GPS satellite information and the base station information, wherein the transmission condition corresponds to a threshold value of variation of phase difference in a GPS satellite wave, the threshold value being set in accordance with an environment surrounding the approximate location of the unit.

7. A method of transmitting location information for a radio communication terminal unit capable of communicating with a location information server and a base station, comprising:

transmitting base station information to the location information server from the radio communication terminal unit;

determining an approximate location of the radio communication terminal unit based on the base station information transmitted to the location information server from the radio communication terminal unit;

setting and transmitting a transmission condition to the radio communication terminal unit based on the approximate location;

receiving the transmission condition from the location information server in the radio communication terminal unit;

receiving GPS satellite information and base station information in the radio communication terminal unit;

extracting a portion of the GPS satellite information and the base station information according to the transmission condition;

transmitting the portion of the GPS satellite information and the base station information to the location information server from the radio communication terminal unit; and determining a location of the radio communication terminal unit based on the extracted portion of the GPS satellite information and the base station information, wherein the transmission condition corresponds to a threshold value of a signal-to-noise ratio of a GPS satellite wave, the threshold value being set in accordance with an arrangement of the base station near the approximate location of the unit.

8. A method of transmitting location information for a radio communication terminal unit capable of communicating with a location information server and a base station, comprising:

transmitting base station information to the location information server from the radio communication terminal unit;

determining an approximate location of the radio communication terminal unit based on the base station information transmitted to the location information server from the radio communication terminal unit;

setting and transmitting a transmission condition to the radio communication terminal unit based on the approximate location;

receiving the transmission condition from the location information server in the radio communication terminal unit;

receiving GPS satellite information and base station information in the radio communication terminal unit;

extracting a portion of the GPS satellite information and the base station information according to the transmission condition;

transmitting the portion of the GPS satellite information and the base station information to the location information server from the radio communication terminal unit; and determining a location of the radio communication terminal unit based on the extracted portion of the GPS satellite information and the base station information, wherein the transmission condition corresponds to a threshold value of variation of phase difference in a GPS satellite wave, the threshold value being set in accordance with an arrangement of the base station near the approximate location of the unit.

* * * * *